UNITED STATES PATENT OFFICE.

MICHEL SCHENK, OF CHICAGO, ILLINOIS, ASSIGNOR, BY MESNE ASSIGNMENTS, TO STEIN-HALL MANUFACTURING COMPANY, OF CHICAGO, ILLINOIS, A CORPORATION OF DELAWARE.

ARTICLE OF FOOD.

1,411,192.  Specification of Letters Patent.  Patented Mar. 28, 1922.

No Drawing.  Application filed October 28, 1918. Serial No. 259,895.

*To all whom it may concern:*

Be it known that I, MICHEL SCHENK, a citizen of the United States, residing at Chicago, in the county of Cook and State of Illinois, have invented a certain new and useful Improvement in Articles of Food, of which the following is a full, clear, concise, and exact description, reference being had to the accompanying drawings, forming a part of this specification.

My invention relates to an article of food which is of particular value when used in connection with the baking of bread or the like, and also to a process of baking. The product aforesaid is adapted more particularly to be mixed with the flour used for baking and when thus used in baking bread, for instance, provides a more palatable bread and also serves to eliminate, if desired, in its entirety, the use of sugar separately provided as yeast food. The use of my improved product brings about the saving of a substantially like amount of wheat or similar flour.

I have found upon experimentation that by the proper conversion of starch that I obtain in the course of this conversion a product having as its major constituents unchanged starch and changed starch, dextrin, maltose, together with a minute quantity of other substances. This product is in the form of an absolutely pure white powder, of which practically forty per cent is represented by the dextrin present.

This pure white powder, I find, may be suitably mixed with wheat or similar flour up to possibly thirty per cent of my improved product to seventy per cent of the wheat or similar flour. A bread of very fine texture is the result of the use of this combination of wheat and my improved product. A firm crust results and the bread is lighter, easily digestible and has a very delicious flavor.

I find upon experimentation that I get the best results if the product which is to be mixed with the flour for baking purposes contains from six to twenty per cent of maltose.

When my improved product is obtained entirely from the conversion or dextrinization of dry starch, I carry on the process of conversion until the desired amount of maltose, as above outlined, is present.

One form of my improved product as obtained by the conversion of starch has the following constituents calculated on a dry basis:

|  | Per cent. |
|---|---|
| $H_2O$ | 5.6 |
| Dextrin | 45.4 |
| Sugar (maltose) | 12.8 |
| Changed starch (including other sugars) | 16.7 |
| Unchanged starch | 13.4 |
| Soluble gums | 3.4 |
| Proteins (N 6.25) | 1.2 |
| Total acidity (as lactic) | 0.38 |
| Fat | 0.37 |
| Ash | 0.27 |
| Fibre | 0.48 |

The above powder is, as stated, absolutely white.

In carrying on my experiments I have found that I get possibly the best results for bread baking when the proportion of my improved product is about in the proportion to twenty per cent of said product to eighty per cent of the other baking flour. The changed and unchanged starch given as part of my improved product in the above anaylsis is preferably not in gelatinized form.

When my product is used for cake or pastry or other baked articles, the proportions given herein may be changed more or less as occasion requires.

I believe that one of the main reasons for obtaining the exceptionally good results in the use of my improved product for baking is due to the presence of the stated high percentage of maltose.

When my improved product is prepared entirely from dry starch, acid is used and during the process part of the acid is evaporated, leaving a very small quantity. This remaining acid in combination with the maltose gives a characteristic sweet sour taste. I find that this slight acidity of the product assists in the raising of the dough.

The maltose present in my improved product is not directly fermented by the yeast, but is first hydrolized to dextrose by the maltose (enzyme) present in most yeasts. This dextrose is further converted into alcohol and carbon dioxide by the yeast.

In thus preparing my improved product directly from starch, I have found that any suitable starches such as corn, tapioca, potato, or the like give good results.

One form of process for the use of my improved product in baking bread consists in the proper mixture of the following ingredients:

80% of ordinary commercial flour, (such as wheat,)
20% of my improved product,
Usual amount of yeast,
Usual amount of salt.

In the above mixture my improved product as apparent represents about twenty per cent.

A particular form of my improved product as used is that given in the formula heretofore set out.

I have given herein a specific example of one of the processes which may be employed in the use of my improved product for the baking of bread and I have also given one of the specific forms which my improved product may take. I have also given certain limits hereinbefore with respect to the percentage that my improved product might be to the ordinary flour when used in the baking of bread, and also the limits defining the amount of maltose. It must be understood that the specific examples of the product and process are merely illustrative and that many changes can readily be made without departing from the spirit of my invention within the limits given.

The resulting bread can, if proportions are correctly chosen, as given herein, present the customary white appearance of white bread. The color of my improved product is pure white and it thus does not change the appearance of the white flour (assuming that white flour is used) with which it is or may be mixed.

I have found that the following process insures the production of my product as above outlined. This process contemplates that the starch to be used may be obtained either from corn, tapioca, potatoes, rice, etc. The starch is then acidulated with a certain per cent of chemically pure hydrochloric acid, this acid being diluted so that it will not reach higher than 10° Baumé. After the starch is diluted with the acid and thoroughly mixed, the acidulated starch is removed to converters which are heated by steam, hot water or oil. These converters are provided with heating drums or jackets through which jackets the heating medium is circulated.

It must be observed that the steam must not be turned on full pressure all at once for the reason that the starch contains normally 12 to 15 per cent water which must be given time to evaporate before actual conversion can begin, otherwise if the full pressure should be turned on all at once the heat would turn the moisture in the starch into steam, thereby forcing the moisture in the starch to evaporate, which would result in the product turning to a dark color.

It is the object of the invention to produce as white a product as is possible so that when the product is mixed with the wheat flour for the purpose intended, it will not be any darker than the flour itself.

The steam is first turned on to 10 pounds and held at this point for 15 minutes, then is increased to 25 pounds for 15 minutes; after this period the pressure is slowly brought up to 75 or 80 pounds where it is held for one hour to one hour and fifteen minutes. The steam pressure is kept on until the right amount of maltose has been obtained. With some starches this will come in one hour after full pressure has been turned on while with other starches it may take as long as one hour and fifteen minutes after full pressure has been turned on.

If oil is used for heating the converter, care must be taken that the oil temperature does not become higher than 400 to 450 degrees. It is better to use steam than oil, as oil cannot be controlled as easily as steam.

Samples are taken from the converters about every 5 minutes after the steam is turned on to full pressure for one hour. Each sample is then tested for solubility and maltose and compared with a standard which is kept of this product.

When the starch has been sufficiently converted, the steam is shut off and the product discharged by means of a door at the bottom of the converter, on to a carrying belt and conveyed to the cooling room, where the temperature is reduced to 140° F. The material is then conveyed to the boilers or screens and screened through fine wire cloth. It is then packed in sacks or barrels for shipment.

This process as is recognized by the literature on the subject will produce a plurality of starch sugars, saccharides, or amyloses, which in the analysis given above form part of the items "maltose" and "changed starch."

Having thus described certain forms which my invention may take, what I claim as new and desire to secure by Letters Patent is:

1. A baking flour composed in part of a dextrinous starch-conversion product containing from six to twenty per cent of maltose and changed starch.

2. A baking flour composed in part of a white dextrinous starch-conversion product containing from six to twenty per cent of maltose and upwards of ten per cent of changed starch.

3. A starch conversion product containing starch, starch sugars, to the extent of at least six per cent amylose and its polymers.

4. A substantially dry, starch conversion product containing starch, intermediate products of amylolysis, and starch sugars to an extent of not less than six per cent by weight.

5. A starch conversion product comprising starch sugars to the extent of at least six per cent and intermediate products of amylolysis, and having an acidity not in excess of two per cent.

6. A starch degradation product adapted for improving dough, containing about twelve to thirteen per cent starch sugars, intermediate products of amylolysis to the extent of about seventy per cent, and showing acidity approximating 0.4 per cent.

In witness whereof, I hereunto subscribe my name this 7th day of October A. D., 1918.

MICHEL SCHENK.